(12) United States Patent
Zhang (10) Patent No.: US 11,066,560 B2
(45) Date of Patent: Jul. 20, 2021

(54) TRANSPARENT SELF-HEALING OMNIPHOBIC COATINGS

(71) Applicant: NBD NANOTECHNOLOGIES, INC., Danvers, MA (US)

(72) Inventor: Bong June Zhang, Chestnut Hill, MA (US)

(73) Assignee: NBD NANOTECHNOLOGIES, INC., Lexington, MA (US)

( * ) Notice: Subject to any disclaimer, the term of this patent is extended or adjusted under 35 U.S.C. 154(b) by 199 days.

(21) Appl. No.: 16/354,384

(22) Filed: Mar. 15, 2019

(65) Prior Publication Data
US 2019/0211216 A1 Jul. 11, 2019

Related U.S. Application Data

(62) Division of application No. 15/353,078, filed on Nov. 16, 2016, now Pat. No. 10,233,336.

(60) Provisional application No. 62/255,776, filed on Nov. 16, 2015.

(51) Int. Cl.
| | | |
|---|---|---|
| C09D 5/16 | (2006.01) | |
| C09D 133/00 | (2006.01) | |
| C08G 77/24 | (2006.01) | |
| C09D 183/08 | (2006.01) | |
| C08G 77/04 | (2006.01) | |

(52) U.S. Cl.
CPC ......... *C09D 5/1625* (2013.01); *C08G 77/045* (2013.01); *C08G 77/24* (2013.01); *C09D 133/00* (2013.01); *C09D 183/08* (2013.01)

(58) Field of Classification Search
CPC ...... B05D 3/142; B05D 5/083; C08G 77/045; C08G 77/24; C09D 133/00; C09D 183/08; C09D 5/1625
See application file for complete search history.

(56) References Cited

U.S. PATENT DOCUMENTS

| 7,193,015 B1 | 3/2007 | Mabry et al. | |
|---|---|---|---|
| 2008/0221262 A1* | 9/2008 | Mabry | C08F 8/42 524/588 |
| 2013/0072609 A1 | 3/2013 | Haddad et al. | |

FOREIGN PATENT DOCUMENTS

WO 2016057599 A1 4/2016

OTHER PUBLICATIONS

Chhatre et al.: "Fluoroalkylated Silicon-Containing Surfaces—Estimation of Solid-Surface Energy", ACS Applied Materials and Interfaces, vol. 2, No. 12, Dec. 22, 2010 (Dec. 22, 2010), pp. 3544-3554.

Office Action for European Patent Application No. 16199216.9, dated Jul. 22, 2020.

Taylor et al.; Further studies of fluoride ion entrapment in octasilsesquioxane cages; X-ray crystal structure studies and factors that affect their formation; Dalton Trans, 2012; pp. 2048-2059; vol. 41.

(Continued)

*Primary Examiner* — Michael B Nelson
(74) *Attorney, Agent, or Firm* — Barnes & Thornburg LLP; Jason Bernstein (57) ABSTRACT

Processes for preparing oleophobic and hydrophobic coatings on a substrate. More particularly, the disclosure relates to omniphobic surface treatment of substrates such as glass, ceramic, glass-ceramic, and the like.

12 Claims, 5 Drawing Sheets

(56) References Cited

OTHER PUBLICATIONS

Anderson et al.; Structural investigation of encapsulated fluoride in polyhedral oligomeric silsesquioxane cages using ion mobility mass; Chem. Mater.; Jun. 2008; pp. 4299-4309; vol. 20.
Ramirez et al.; Functionalization of fluoroalkyl polyhedral oligomeric silsesquioxanes (F-POSS); ACS Symposium Series; vol. 1106, Aug. 16, 2012; pp. 95-109.
Mabry et al.; Fluorinated polyhedral oligomeric silsesquioxanes (F-POSS); Angew. Chem. Int. Ed.; 2008; pp. 4137-4140; vol. 47.
Tuteja et al.; Designing superoleophobic surfaces; Science; Dec. 7, 2007; pp. 1618-1622; vol. 318.
Tuteja et al.; Robust omniphobic surfaces; PNAS; Nov. 25, 2008; pp. 18200-18205; vol. 105, No. 47.
Chhatre et al.; Fluoroalkylated silicon-containing surfaces—estimation of solid-surface energy; Applied Materials & Interfaces; Nov. 10, 2010; pp. 1544-1554; vol. 2, No. 12.
Search Report for European Patent Application No. 16199216.9; dated Apr. 6, 2017.
U.S. Appl. No. 62/118,220, filed Feb. 19, 2015.
Ramirez, et al., Incompletely condensed fluoroalkyl silsesquioxanes and derivatives: precursors for low surface energy materials, J. Am. Chem. Soc., 2011, vol. 133, pp. 20084-20087.

\* cited by examiner

TRANSPARENT SELF-HEALING OMNIPHOBIC COATINGS

CROSS-REFERENCE TO RELATED APPLICATIONS

This application is a divisional of co-pending U.S. patent application Ser. No. 15/353,078, filed Nov. 16, 2016, which claims priority to U.S. Provisional Patent Application No. 62/255,776, filed Nov. 16, 2015, and commonly assigned to the assignee of the present application, the disclosures of which are incorporated by reference in their entirety herein.

FIELD

The present disclosure relates, in exemplary embodiments, to processes for preparing oleophobic and hydrophobic coatings on a substrate. More particularly, the disclosure relates to omniphobic surface treatment of substrates such as glass, ceramic, glass-ceramic, and the like.

BACKGROUND

The presence of liquids, often laden with dirt, is critical in safety particularly, for a transparent substrate of the glazing type, especially one used in the transportation. The nonwetting property of a substrate can be categorized into omniphobic. Omniphobic substrate means oil (including organic liquids) and water repellent substrate. Usually, the contact angle of omniphobic surface is at least higher than 70° for hexadecane and 90° in the case of water in case of flat surface. The liquid tends to bead up and easily flow off the substrate, simply by gravity if the substrate is inclined, or under the effect of aerodynamic forces or mechanical motions (vibration and rocking) during operation of vehicle.

The benefit of incorporating an omniphobic coating of the invention on a substrate, especially a glass substrate, for this type of product is twofold. Firstly, it allows the water droplets to slide off vertical or inclined surfaces, especially under the effect of aerodynamic forces or mechanical motions, for example in the case of a moving vehicle. Secondly, these droplets, sliding off the substrate, cleanse the surface by incorporating dirt and carry this away. Especially, the visibility of glass substrates can be improved to a certain degree by dispensing windshield washer fluids or cleaning devices windshield wipers.

One of the problems arising with the greatest acuity in the field of omniphobic coatings is that of the mechanical abrasion of the omniphobic coating. This abrasion occurs to a greater or lesser extent during substrate cleaning operations, which are periodically necessary, in particular for restoring satisfactory vision through a transparent substrate. Thus, it has long been sought to minimize the gradual removal of the omniphobic coatings of the aforementioned types, this occurring in particular under the action of windshield wipers in the case of an automobile, airplane, boat/ship windshield. Such removal may moreover and additionally result from degradation by ultraviolet radiation.

Because of the problems outlined above, there is a need for improved omniphobic coatings.

SUMMARY

It has been discovered that certain fluoroalkyl phosphonic acids (FAPA), fluoroalkyl phosphonates (FAPN), fluoroalkyl silanes (FAS), fluoroalkyl halides (FAH), and fluoride ion encapsulated fluoro oligomeric silsesquioxanes (F−@F-POSS, also referred to herein as F@F-POSS) can be applied to substrates as omniphobic coatings with improved properties. Also described are processes for preparing omniphobic coatings.

In one aspect, the present disclosure provides exemplary embodiments of a process for obtaining an omniphobic coating on a substrate comprising:
a. activating a substrate by contacting the substrate with a plasma of a gas;
b. depositing a first layer of an omniphobic coating comprising at least one fluoride ion-encapsulated functionalized fluoropolyhedral oligomeric silsesquioxane, and at least one fluorocompound.

In some embodiments, the at least one fluoride ion-encapsulated functionalized fluoropolyhedral oligomeric silsesquioxane (F@F-POSS) is a compound of the structural formula [1]:

[1]

wherein $R^A$ is $(R^f)_{8-r}$ or $(R^p)_r$; $R^f$ is $F_3C(CF_2)_m(CH_2)_n-$; $R^p$ is $(HO)_p(Y)_{2-p}P(O)(CH_2)_q-$; Y is a hydrolysable group; m is an integer from 0 to about 15; n is an integer from 0 to about 5; p is 0, 1 or 2; q is an integer from 0 to about 5; and r is an integer from 1 to 8.

In some embodiments, the at least one fluoride ion-encapsulated functionalized fluoropolyhedral oligomeric silsesquioxane (F@F-POSS) is a compound of the structural formula [2]:

[2]

wherein $R^1$ is $C_1$-$C_6$ alkyl, $C_2$-$C_6$ alkenyl or $C_2$-$C_6$ alkynyl; $R^f$ is $F_3C(CF_2)_m(CH_2)_n-$; $R^p$ is $(HO)_p(Y)_{2-p}P(O)(CH_2)_q-$; Y is a hydrolysable group; m is an integer from 0 to about 15; n is an integer from 0 to about 5; p is 0, 1 or 2; and q is an integer from 0 to about 5.

In some embodiments, the at least one fluorocompound is selected from the group consisting of a fluoroalkyl phosphonic acid (FAPA), a fluoroalkyl phosphonate (FAPN), a fluoroalkyl silane (FAS), a fluoroalkyl halide (FAH), and combinations thereof.

In some embodiments, the at least one fluorocompound is a compound selected from the group consisting of a compound of the formula wherein m1 is an integer from 0 to 15; n1 is an integer from 0 to 5; p1 is 0, 1 or 2; and Y is a hydrolysable group, such as a halide group or an alkoxy group; a compound of the formula wherein m2 is an integer from 0 to 15; n2 is an integer from 0 to 5; t is and integer from 0 to 3; R is an alkyl group or a hydrogen atom; and Z is a hydrolysable group; and a compound of the formula wherein m3 is an integer from 0 to 15; and X is a halogen.

In some embodiments, the step of depositing is carried out in the presence of a mixture of at least one polar solvent and an aqueous acid or base.

In another aspect, the present disclosure provides a fluoride ion-encapsulated functionalized fluoropolyhedral oligomeric silsesquioxane of the formula [1]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

In another aspect, the present disclosure provides a functionalized fluoropolyhedral oligomeric silsesquioxane of the formula [1a]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

In another aspect, the present disclosure provides a fluoride ion-encapsulated functionalized fluoropolyhedral oligomeric silsesquioxane of the formula [2]:

wherein $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; and q is an integer from 0 to about 5.

In another aspect, the present disclosure provides a fluoride ion-encapsulated functionalized fluoropolyhedral oligomeric silsesquioxane of the formula [2]:

wherein $R^1$ is $C_1$-$C_6$ alkyl, $C_2$-$C_6$ alkenyl or $C_2$-$C_6$ alkynyl; $R^1$ is $C_1$-$C_6$ alkyl, $C_2$-$C_6$ alkenyl or $C_2$-$C_6$ alkynyl; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; and q is an integer from 0 to about 5.

In another aspect, the present disclosure provides a substrate comprising a first coating layer comprising at least one fluoride ion-encapsulated functionalized fluoropolyhedral oligomeric silsesquioxane of the formula [1]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group;

m is an integer from 0 to about 15; n is an integer from 0 to about 5; p is 0, 1 or 2; q is an integer from 0 to about 5; and r is an integer from 1 to 8, and at least one fluorocompound. In some embodiments, the substrate is glass or ceramic.

In another aspect, the present disclosure provides a substrate comprising a first coating layer comprising at least one fluoride ion-encapsulated functionalized fluoropolyhedral oligomeric silsesquioxane of the formula [2]

[2]

wherein $R^1$ is $C_1$-$C_6$ alkyl, $C_2$-$C_6$ alkenyl or $C_2$-$C_6$ alkynyl; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; and q is an integer from 0 to about 5.

In another aspect, the present disclosure provides a substrate comprising a layer formed by a process comprising:

a. activating a substrate by contacting the substrate with a plasma of a gas;

b. depositing a first layer of an omniphobic coating comprising at least one fluoride ion-encapsulated functionalized fluoropolyhedral oligomeric silsesquioxane, and at least one fluorocompound.

In another aspect, the disclosure provides an omniphobic glazed substrate comprising a layer comprising at least one fluoride ion-encapsulated functionalized fluoropolyhedral oligomeric silsesquioxane of the formula [1]

[1]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8, and at least one fluorocompound.

In another aspect, the disclosure provides an omniphobic glazed substrate comprising a layer comprising at least one fluoride ion-encapsulated functionalized fluoropolyhedral oligomeric silsesquioxane of the formula [2]

[2]

wherein $R^1$ is $C_1$-$C_6$ alkyl, $C_2$-$C_6$ alkenyl or $C_2$-$C_6$ alkynyl; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; and q is an integer from 0 to about 5.

In another aspect, the present disclosure provides an omniphobic coating comprising a fluoride ion-encapsulated functionalized fluoropolyhedral oligomeric silsesquioxane and at least one fluorocompound. In some embodiment, the fluorocompound is elected from the group consisting of a fluoroalkyl phosphonic acid (FAPA), fluoroalkyl phosphonate (FAPN), a fluoroalkyl silane (FAS), and a fluoroalkyl halide (FAH) or a combination thereof.

BRIEF DESCRIPTION OF THE DRAWINGS

The drawings disclose exemplary embodiments in which like reference characters designate the same or similar parts throughout the figures of which.

DETAILED DESCRIPTION

The present disclosure relates, in exemplary embodiments, to the omniphobic surface treatment of a substrate, especially, a glass material, a ceramic, a glass-ceramic, with at least one fluorocompound. Substrates for use in connection with the disclosure can be, for example, glass parts for rear view camera lens, windshields, and side windows in, for example, the aeronautical, railway or automotive fields. In some embodiments, substrates for use in connection with the present disclosure will contain free hydroxyl groups on their surface. In some embodiments, substrates for use in connection with the present disclosure can be a glass or oxide surface having free hydroxyl groups on the surface. It will be appreciated that the omniphobic surface treatments described herein can also be used in other fields, such as the building field or in the interior design field, for example as decorative panels, for furniture, for domestic electrical equipment (such as refrigerator doors, oven doors, and display cases), and the like.

As used herein, "alkyl" refers to a saturated aliphatic hydrocarbon radical including straight chain and branched chain groups of 1 to 20 carbon atoms (e.g. $C_1$-$C_{20}$), preferably 1 to 12 carbon atoms (e.g. $C_1$-$C_{12}$), more preferably 1 to 8 carbon atoms (e.g. $C_1$-$C_8$), or 1 to 6 carbon atoms (e.g. $C_1$-$C_6$), or 1 to 4 carbon atoms (e.g. $C_1$-$C_4$). "Lower alkyl" refers specifically to an alkyl group with 1 to 4 carbon atoms. Examples of alkyl groups include methyl, ethyl, propyl, 2-propyl, n-butyl, iso-butyl, tert-butyl, pentyl, and the like. Alkyl may be substituted or unsubstituted. Typical substituent groups include those conventionally known in the art, such as cycloalkyl, aryl, heteroaryl, heteroalicyclic, hydroxy, alkoxy, aryloxy, mercapto, alkylthio, arylthio, cyano, halo, carbonyl, thiocarbonyl, O-carbamyl, N-carbamyl, O-thiocarbamyl, N-thiocarbamyl, C-amido, N-amido, C-carboxy, O-carboxy, nitro, silyl, amino and —$NR^xR^y$, where R. and $R^y$ are independently selected from the group consisting of hydrogen, alkyl, cycloalkyl, aryl, carbonyl, acetyl, sulfonyl, trifluoromethanesulfonyl and, combined, a five- or six-member heteroalicyclic ring. Substituent groups also include those described elsewhere in this disclosure in connection with alkyl.

As used herein, "alkenyl" refers to an alkyl group, as defined herein, that is further defined by the inclusion of at least two carbon atoms and at least one carbon-carbon double bond. "Alkenyl" includes groups having from 2 to 8 carbon atoms and at least one carbon-carbon double bond (e.g. "$C_2$-$C_8$ alkenyl"). Representative examples include, but are not limited to, ethenyl, 1-propenyl, 2-propenyl, 1-, 2-, or 3-butenyl, and the like. Alkenyl may be substituted as described above for alkyl or unsubstituted. Substituent groups also include those described elsewhere in this disclosure in connection with alkenyl.

As used herein, "alkynyl" refers to an alkyl group, as defined herein, that is further defined by the inclusion of at least two carbon atoms and at least one carbon-carbon triple bond. "Alkynyl" includes groups having from 2 to 8 carbon atoms and at least one carbon-carbon triple bond (e.g. "$C_2$-$C_8$ alkynyl"). Representative examples include, but are not limited to, ethynyl, 1-propynyl, 2-propynyl, 1-, 2-, or 3-butynyl, and the like. Alkynyl may be substituted as described above for alkyl or unsubstituted. Substituent groups also include those described elsewhere in this disclosure in connection with alkynyl.

As used here, the term "omniphobic substrate" means an oil (including organic liquids) and water repellent substrate. As is conventionally known in the art, the contact angle of an omniphobic surface on a flat surface is typically at least greater than 70° for hexadecane and typically at least greater than 90° in the case of water. On an omniphobic surface, a liquid tends to bead up and easily flow off a substrate, by, for example, gravity if the substrate is on an incline; or under the effect of aerodynamic forces or mechanical motion (vibration and rocking) if the surface is in motion as, for example, during the operation of a vehicle.

Agents useful for imparting a omniphobic properties onto a surface and that can be used to form of a coating layer on a substrate, include but are not limited to, fluoroalkyl phosphonic acid (FAPA), fluoroalkyl phosphonate (FAPN), fluoroalkylsilanes (FAS), alkylsilanes (AS), fluoroalkyl halide (FAH) or fluoride ion encapsulated fluoro polyhedral oligomeric silsesquioxane (F@F-POSS) such as those described in US patent publication number US2002/0221262, incorporated herein by reference, in acidic or alkaline solution.

Examples of FAPA and FAPN agents useful in connection with the present teachings include, for example, compounds of the formula wherein m1 is an integer from 0 to 15; n1 is an integer from 0 to 5; p1 is 0, 1 or 2; and Y is a hydrolysable group, such as a halide group or an alkoxy group.

Examples of FAS agents useful in connection with the present teachings include, for example, alkyl silanes, the alkyl group of which has at least one perfluorinated end group, such as an $F_3C$—$(CF_2)_n$— group, wherein n is zero or a positive integer. Examples of FAS agents useful in connection with the present teachings include FAS agents of the formula wherein m2 is an integer from 0 to 15; n2 is an integer from 0 to 5; t is an integer from 0 to 3; R is an alkyl group or a hydrogen atom; and Z is a hydrolysable group, such as a halide group or an alkoxy group. In some embodiments, m2 is an integer from about 3 to about 7. In some embodiments, n2 is an integer of about 2. In some embodiments, t is 0 or 1. In some embodiments, t is 0.

Examples of FAH agents useful in connection with the present teachings include FAH agents of the formula wherein m3 is an integer from 0 to 15; and X is a halogen.

Examples of AS agents useful in connection with the present teachings include AS agents of the formula wherein m4 is an integer from 0 to 15; p2 is 0, 1 or 2; R is an alkyl group or a hydrogen atom; and X is a hydrolysable group, such as a halide group or an alkoxy group. In some embodiments, m4 is an integer from about 3 to about 5. In some embodiments, p2 is 0 or 1. In some embodiments, p2 is 0.

As used herein, "hydrolysable group" means any group known in the art to be an group in an organo-silane compound that is capable of hydrolysis by water. Such groups include, but are not limited to a halide group, an alkoxy group, an acyloxy group. Examples of hydrolysable groups, include, but are not limited to, chloride, bromide, iodide, methoxy, ethoxy. propoxy, acetoxy, and the like.

Polyhedral silsesquioxanes have a cage-like structure, which is most commonly a cube, hexagonal prism, octagonal prism, decagonal prism, or dodecagonal prism. In exemplary embodiments, of the various possible F-POSS cage molecular structures, the cube-like ("T8") cage structure is formed. In exemplary embodiments, the present disclosure provides F-POSS compositions made of a blend of feedstock materials. In one exemplary embodiment, a first feedstock comprises a first fluorinated triethoxysilane and a second feedstock comprises a second fluorinated triethoxysilane. Each fluorinated triethoxysilane has a distinct carbon chain length C. In exemplary embodiments, C is in a range of 4-10. In exemplary embodiments, C is in a range of 6 to 8. In exemplary embodiments, C is 4, 6, 8 or 10. In exemplary embodiments, a first feedstock may be a C6 fluoroalkyl molecule and the second feedstock may be a C8 fluoroalkyl molecule. In exemplary embodiments, a first feedstock may be 1H,1H,2H,2H nonafluorohexyltriethoxysilane. In exemplary embodiments, a second feedstock may be 1H,1H,2H,2H perfluorooctyltriethoxysilane (a.k.a triethyl(1H, 1H,2H, 2H-perfluorooctyl) silane.

As examples, formulae for 6/2 F-POSS [3] and 4/2 F-POSS [4] molecules are shown below.

[3]

6/2 F-POSS

R = CH$_2$CH$_2$CF$_2$CF$_2$CF$_2$CF$_2$CF$_2$CF$_3$

[4]

4/2 F-POSS

R = CH$_2$CH$_2$CF$_2$CF$_2$CF$_2$CF$_3$

F@F-POSS molecules useful in connection with the present disclosure include molecules of the formula [5]:

[5]

wherein Rf is F$_3$C—(CF$_2$)$_m$—(CH$_2$)$_n$—, wherein m is an integer from 0 to 15 and n is an integer from 0 to 5. In some embodiments, m is an integer from about 3 to about 5. In some embodiments, n is an integer of about 2.

Described herein are fluoride ion-encapsulated functionalized fluoropolyhedral oligomeric silsesquioxane (F@F-POSS) compounds of the structural formula [1]:

[1]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

In some embodiments, p is 0 (in such a case, the functionalized fluoropolyhedral oligomeric silsesquioxane can be described as F@FPOSSEPN). In some embodiments, p is 2 (in such a case, the functionalized fluoropolyhedral oligomeric silsesquioxane can be described as F@FPOSSEPA). In some embodiments, m is an integer from 3 to 5. In some embodiments, m is 3. In some embodiments, m is 4. In some embodiments, m is 5. In some embodiments, n is an integer from 1 to 3. In some embodiments, n is 2. In some embodiments, n is 3. In some embodiments, q is an integer from 1 to 3. In some embodiments, q is 2. In some embodiments, q is 3. In some embodiments, r is 1. In some embodiments, r is 2. In some embodiments, r is 3. In some embodiments, r is 4. In some embodiments, r is 5. In some embodiments, r is 6. In some embodiments, r is 7. In some embodiments, r is 8. In some embodiments, the hydrolysable group is an alkoxy group or an acyloxy group. In some embodiments, the hydrolysable group is an alkoxy group. In some embodiments, the hydrolysable group is an acyloxy group. In some embodiments, the hydrolysable group is an alkoxy group selected from the group consisting of methoxy, ethoxy, propoxy, iso-propoxy and n-butoxy. In some embodiments, the hydrolysable group is an acetoxy.

Described herein are functionalized fluoropolyhedral oligomeric silsesquioxane compounds of the structural formula [1a]:

[1a]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

In some embodiments, p is 0 (in such a case, the functionalized fluoropolyhedral oligomeric silsesquioxane can be described as F@FPOSSEPN). In some embodiments, p is 2 (in such a case, the functionalized fluoropolyhedral oligomeric silsesquioxane can be described as F@FPOSSEPA). In some embodiments, m is an integer from 3 to 5. In some embodiments, m is 3. In some embodiments, m is 4. In some embodiments, m is 5. In some embodiments, n is an integer from 1 to 3. In some embodiments, n is 2. In some embodiments, n is 3. In some embodiments, q is an integer from 1 to 3. In some embodiments, q is 2. In some embodiments, q is 3. In some embodiments, r is 1. In some embodiments, r is 2. In some embodiments, r is 3. In some embodiments, r is 4. In some embodiments, r is 5. In some embodiments, r is 6. In some embodiments, r is 7. In some embodiments, r is 8. In some embodiments, the hydrolysable group is an alkoxy group or an acyloxy group. In some embodiments, the hydrolysable group is an alkoxy group. In some embodiments, the hydrolysable group is an acyloxy group. In some embodiments, the hydrolysable group is an alkoxy group selected from the group consisting of methoxy, ethoxy, propoxy, iso-propoxy and n-butoxy. In some embodiments, the hydrolysable group is an acetoxy.

Properties

In some embodiments, one object for substrates as described herein having omniphobic properties is to provide the substrate with an optically transparent, nonwetting, and mechanically durable characteristic. The term "wettability" denotes the property whereby polar or nonpolar liquids adhere to the substrate, forming an undesirable film, and also the tendency of a substrate to retain dust or dirt of all kinds, fingerprints, insects, and the like.

In some embodiments, the other objects of the present disclosure are substrates coated with an omniphobic coating and its process, the properties of which are improved. More particularly, omniphobic substrates described herein provide not only with coatings having desirable wettability characteristics, but also improved abrasion resistance performance and/or self-healing never yet observed in relation to the performance of coatings known at the present time. Furthermore, according to another aspect of the present disclosure, omniphobic substrates described herein can have a particularly high hydrolytic resistance.

Such performance typically provides the omniphobic substrates that more effectively meet the specifications imposed at the present time in, for example, the automotive or aeronautical industries, in terms of, for example, abrasion resistance, UV resistance, and salt corrosion resistance.

Products

Exemplary embodiments of omniphobic glazed substrates obtained by exemplary methods described herein are optically transparent, mechanically resistant, and self-healing. The present disclosure also relates to omniphobic glazing comprising or formed by a substrate as described herein. Such glazing being in useful as glazing in numerous fields, for example in vehicles or buildings.

The present disclosure also relates to a glass, ceramic or glass-ceramic substrate provided with an omniphobic coating that can be obtained by implementing a process according to one of the embodiments described herein. The coating comprises an omniphobic layer of fluorocompound and at least one fluoride ion-encapsulated functionalized fluoropolyhedral oligomeric silsesquioxane in aqueous base or acid. In some embodiments, the surface of which has an RMS surface roughness of greater than 5 nm and has been activated by treatment with a plasma of a gas chosen from the noble gases, of the Ar or He type, and the gases $N_2$ or $O_2$, or by a plasma of a mixture of at least two of these gases, preferably under conditions not modifying or substantially not modifying the surface roughness. In some embodiments, the deposition of at least one fluorocompound and at least one fluoride ion-encapsulated functionalized fluoropolyhedral oligomeric silsesquioxane comprising an omniphobic coating is assisted by aqueous base or acid to be bound on the substrate.

In some embodiments, the substrate is obtained by carrying out an activation step activated by means of a plasma of a gas mixture containing $H_2O$ and at least one gas chosen from Ar, He or $N_2$. In some embodiments, an omniphobic layer having a thickness of between about 10 and about 500 nm is obtained. In some embodiments, the thickness is between about 20 and about 200 nm.

In some embodiments, the RMS roughness of the omniphobic layer is less than about 10 nm. In some embodiments, the RMS roughness of the omniphobic layer is between 5 and 10 nm.

Processes

It will be appreciated that functionalized fluoropolyhedral oligomeric silsesquioxane compounds of the structural formula [1a]:

[1a]

wherein $R^A$ is as defined herein can be prepared by any method known in the art for the preparation of functionalized F-POSS compounds.

In a first aspect, functionalized fluoropolyhedral oligomeric silsesquioxane compounds of the structural formula [1a] can be produced according to methods described in International Patent Application No. PCT/US2015/054367, and similar methods. For example, in some embodiments, feedstocks including at least one fluorinated trialkoxysilane, such as triethoxy(1H,1H,2H,2H-perfluorooctyl)silane, and at least one triethoxysilyl phosphonate, such as diethyl [2-(triethoxysilyl)-ethyl]phosphonate, can be mixed in an organic solvent, including polar organic solvents, such as ethanol or methanol, and stirred at room temperature to provide the desired F-POSS phosphonate.

In a second aspect, an F-POSS phosphoric acid of the formula [1a] can be prepared by mixing an F-POSS phosphonate of the formula [1a] with concentrated acid. In some embodiments, it can be advantageous to heat the mixture for a period of time, such as heating to 140° C. for 6 hours. After heating, the acidic mixture can be neutralized by washing with water, and dried under reduced pressure to provide the desired F-POSS phosphoric acid.

In a third aspect, fluoride ion-encapsulated functionalized fluoropolyhedral oligomeric silsesquioxane (F@F-POSS) compounds of the structural formula [1] can be prepared by mixing either a F-POSS phosphonate and F-POSS phosphoric acid of the formula [1a] with fluoride reagent capable of providing a fluoride ion, such as tetramethylammonium fluoride in an organic solvent, such as tetrahydrofuran (THF), diethyl ether (Et$_2$O), dichloromethane (DCM), and the like to provide the desired product.

It will be appreciated that functionalized fluoropolyhedral oligomeric silsesquioxane compounds of the structural formula [2a]:

[2a]

wherein $R^1$, $R^f$ and $R^p$ are as described herein can be prepared by any method known in the art for the preparation of functionalized F-POSS compounds.

In a fourth aspect, functionalized fluoropolyhedral oligomeric silsesquioxane compounds of the structural formula [2a] can be prepared according to methods described in U.S. Provisional Patent Application No. 62/118,220, and similar methods. For example, in some embodiments, an F-POSS compound of the formula [5a]

[5a]

can be contacted, in the presence of an aqueous base catalyst, such as tetraethylammonium hydroxide, with a compound of the formula $R^1R^pSi(OR^2)_2$, wherein $R^1$ is selected from the group consisting of $C_1$-$C_8$ alkyl, $C_2$-$C_8$ alkenyl and $C_2$-$C_8$ alkynyl; $R^p$ is as defined herein; and $R^2$ is $C_1$-$C_8$ alkyl; to provide a compound of the formula [2a]. An example of a compound of the formula $R^1R^pSi(OR^2)_2$ suitable for use in connection with the present disclosure is diethyl [2-(diethoxymethylsilyl)ethyl]phosphonate. Alternatively, functionalized fluoropolyhedral oligomeric silsesquioxane compounds of the structural formula [2a] can be prepared according to the methods described in Ramirez, S. M.; Diaz, Y. J.; Campos, R.; Stone, R. L.; Haddad, T. S.; Mabry, J. M. *J. Am. Chem. Soc.,* 2011, 133, 20084-20087.

In a fifth aspect, an F-POSS phosphoric acid of the formula [2a] can be prepared by mixing an F-POSS phosphonate of the formula [2a] with concentrated acid. In some embodiments, it can be advantageous to heat the mixture for a period of time, such as heating to 140° C. for 6 hours. After heating, the acidic mixture can be neutralized by washing with water, and dried under reduced pressure to provide the desired F-POSS phosphoric acid.

In a sixth aspect, fluoride ion-encapsulated functionalized fluoropolyhedral oligomeric silsesquioxane (F@F-POSS) compounds of the structural formula [2] can be prepared by mixing either a F-POSS phosphonate and F-POSS phosphoric acid of the formula [2a] with fluoride reagent capable of providing a fluoride ion, such as tetramethylammonium fluoride in an organic solvent, such as tetrahydrofuran (THF), diethyl ether (Et$_2$O), dichloromethane (DCM), and the like to provide the desired product.

A layer on a substrate can be prepared by applying a solution containing at least one fluoride ion-encapsulated functionalized fluoropolyhedral oligomeric silsesquioxane and at least one fluorocompound in an aqueous or nonaqueous acidic or basic solvent to the surface of a substrate.

According to a first aspect, the disclosure provides a process for obtaining an omniphobic coating on a substrate comprising the steps of
(a) activating a substrate by contacting the substrate with a plasma of a gas; and
(b) depositing an omniphobic coating comprising at least one fluoride ion-encapsulated functionalized fluoropolyhedral oligomeric silsesquioxane as described herein.

In some embodiments, the substrate is a glass material, a ceramic or a glass-ceramic. In some embodiments, the gas is an inert gas, such as Ar or He, a gas, such as N$_2$, O$_2$, or H$_2$O vapor, or a mixture of such gases. In some embodiments, the activating can be carried out by a plasma of a gas mixture containing H$_2$O. In some embodiments, the at least one fluorocompound is deposited in a mixture with a protic or an aprotic solvent, and at least one fluoride ion-encapsulated functionalized fluoropolyhedral oligomeric silsesquioxane. In some embodiments, the at least one fluorocompound is deposited in a mixture with a protic or an aprotic solvent containing an aqueous base or an aqueous acid, and at least one fluoride ion-encapsulated functionalized fluoropolyhedral oligomeric silsesquioxane.

In some embodiments, the step of depositing is carried out by dip, spray, or thermal chemical vapor deposition (CVD) under conditions enabling an RMS surface roughness of between 5 and 100 nm to be obtained. In some embodiments, the step of depositing provides an RMS surface roughness of between 5 and 10 nm.

In some embodiments, the step of depositing the omniphobic coating is carried out using a solution obtained from a mixture of a fluorocompound, a fluoride ion encapsulated fluoro polyhedral oligomeric silsesquioxane as described herein, and aqueous acid or base.

In some embodiments, aqueous acid or base is required to assist nucleophilic reaction of the fluorocompound. In some embodiments, the acid can be ascorbic acid, citric acid, salicylic acid, acetic acid, hydrochloric acid, oxalic acid, phosphoric acid or sulfuric acid. In some embodiments, the base can be ammonium hydroxide, sodium bicarbonate, sodium carbonate, sodium hydroxide, or potassium hydroxide.

Activating Plasma Conditions: The substrate can be treated by an activated gas in the form of a plasma. This step may be carried out in various vacuum or atmospheric-pressure chambers. For example, it is possible to use a parallel-plate RF reactor. The treatment results in a chemical modification of the substrate, but no physical alteration such as morphology. The gas used is chosen from Ar, He, N$_2$, or O$_2$ or a mixture of these gases. The working pressure is regulated between 50 and 500 mtorr, the power between 10 and 200 W, and the activation time is preferably between about 1 minute and about 5 minutes, typically within 1 minute.

Omniphobic Layer Deposition Conditions: In some embodiments, the omniphobic layer comprising at least one fluorocompound and at least one at least one fluoride ion-encapsulated functionalized fluoropolyhedral oligomeric silsesquioxane may be deposited by any technique known in the art. In particular, the omniphobic layer may be deposited, without being restricted thereto, by dipping, spraying, and wipe-on techniques well known in the field of surface coatings.

The following numbered clauses include embodiments that are contemplated and non-limiting:

Clause 1. In exemplary embodiments, disclosed is a process for obtaining an omniphobic coating on a substrate comprising: a. activating a substrate by contacting the substrate with a plasma of a gas; and, b. depositing a first layer of an omniphobic coating comprising at least one fluoride ion-encapsulated functionalized fluoropolyhedral oligomeric silsesquioxane, and at least one fluorocompound.

Clause 2. The process of claim 1, wherein at least one fluoride ion encapsulated functionalized fluoropolyhedral oligomeric silsesquioxane (F@F-POSS) is a compound of the structural formula [1]:

[1]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

Clause 3. The process of Clause 1, wherein the at least one fluorocompound is selected from the group consisting of a fluoroalkyl phosphonic acid (FAPA), a fluoroakyl phosphonate (FAPN), a fluoroalkyl silane (FAS), a fluoroalkyl halide (FAH), and combinations thereof.

Clause 4. The process of Clause 1, wherein the at least one fluorocompound is a compound selected from the group consisting of a compound of the formula wherein m1 is an integer from 0 to 15; n1 is an integer from 0 to 5; p1 is 0, 1 or 2; and Y is a hydrolysable group, such as a halide group or an alkoxy group; a compound of the formula wherein m2 is an integer from 0 to 15; n2 is an integer from 0 to 5; t is and integer from 0 to 3; R is an alkyl group or a hydrogen atom; and Z is a hydrolysable group; and a compound of the formula wherein m3 is an integer from 0 to 15; and X is a halogen.

Clause 5. The process of Clause 1, wherein the step of depositing is carried out in the presence of a mixture of at least one polar solvent and an aqueous acid or base.

Clause 6. A fluoride ion-encapsulated functionalized fluoropolyhedral oligomeric silsesquioxane of the formula [1]

[1]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

Clause 7. A functionalized fluoropolyhedral oligomeric silsesquioxane of the formula [1a]

[1a]

wherein $R^A$ is $(R^f)_{8-r}$ or $(R^p)_r$; $R^f$ is $F_3C(CF_2)_m(CH_2)_n$—; $R^p$ is $(HO)_p(Y)_{2-p}P(O)(CH_2)_q$—; Y is a hydrolysable group; m is an integer from 0 to about 15; n is an integer from 0 to about 5; p is 0, 1 or 2; q is an integer from 0 to about 5; and r is an integer from 1 to 8.

Clause 8. A substrate, comprising: a first coating layer comprising at least one fluoride ion-encapsulated functionalized fluoropolyhedral oligomeric silsesquioxane of the formula [1]

[1]

wherein $R^A$ is $(R^f)_{8-r}$ or $(R^p)_r$; $R^f$ is $F_3C(CF_2)_m(CH_2)_n—$; $R^p$ is $(HO)_p(Y)_{2-p}P(O)(CH_2)_q—$; Y is a hydrolysable group; m is an integer from 0 to about 15; n is an integer from 0 to about 5; p is 0, 1 or 2; q is an integer from 0 to about 5; and r is an integer from 1 to 8, and at least one fluorocompound.

Clause 9. A substrate comprising a layer formed by a process, comprising: a. activating a substrate by contacting the substrate with a plasma of a gas; and, b. depositing a first layer of an omniphobic coating comprising at least one fluoride ion-encapsulated functionalized fluoropolyhedral oligomeric silsesquioxane, and at least one fluorocompound.

The following examples are set forth for purposes of illustration only. Parts and percentages appearing in such examples are by weight unless otherwise stipulated.

EXAMPLES

Example 1—Preparation of a Glass Substrate with Plasma Activation

The substrate was placed in a chamber of a low-pressure PECVD (plasma-enhanced chemical vapor deposition) reactor. A residual vacuum in the chamber of at least 5 mPa ($5 \cdot 10^{-5}$ mbar) was firstly created prior to the activating gas being introduced. The gas or gas mixture used for the surface treatment of the silicon oxycarbide or silica was introduced into the chamber with flow rates varying between 20 sccm and 200 sccm until the total pressure in the reactor was set between 9.99 and 26.66 Pa (75-200 mTorr).

At equilibrium, a plasma of the gas introduced was ignited by electrically biassing the gas diffuser with an average radiofrequency (13.56 MHz) power of 200 W for a time ranging from 1 to 5 minutes at room temperature.

Example 2—Preparation of Fluoride-Ion Encapsulated Fluoro Polyhedral Oligomeric Silsesquioxane Ethyl Phosphonic Acid (F$^-$@F-POSSEPA) or Fluoro Polyhedral Oligomeric Silsesquioxane Ethyl Phosphonate (F$^-$@F-POSSEPN)

Step A: Preparation of F-POSSEPN

A mixture of two constituents triethoxy(1H,1H,2H,2H-perfluoroctyl)silane (6 g, 11.75 mmol, 7 equiv, $C_6F_{13}(CH_2)_2Si(OEt)_3$, available from Sigma-Aldrich) and diethyl [2-(triethoxysilyl)-ethyl]phosphonate (0.55 g, 1.67 mmol, 1 equiv, $(EtO)_2P(O)(CH_2)_2Si(OEt)_3$ available from Fluorochem), were dissolved in 10 mL ethanol, and stirred at room temperature for 12 hours in a 50 mL round bottom flask. A white precipitated solid in ethanol was filtered and dried to provide 4.2 g F-POSSEPN as a white solid.

$^1$H NMR (Acetone-D) δ 1.05 ppm (t, 3H), 1.13 ppm (m, 16H), 2.33 ppm (m, 16H), 4.08 ppm (q, 2H).

$^{13}$C NMR (Acetone-D) δ 28, 64, 93, 95, 108, 110, 113, 114, 117, 119, 122.

Step B: Preparation of F-POSSEPA 10 g of F-POSSEPN obtained in Step A was mixed with 10 mL of concentrated hydrochloric acid for six hours in a 50 mL round bottom flask. The mixture was heated to 140° C. for 6 hours, then the acidic mixture was neutralized by washing two times with 50 mL water, and dried under reduced pressure to provide F-POSSEPA as a white solid in 100% yield.

$^1$H NMR (Acetone-D) δ 1.06 ppm (br, 16H), 2.33 ppm (br, 16H), 3.79 ppm (br, 1H).

Step C: Preparation of F$^-$@F-POSSEPA or F$^-$@F-POSSEPN

Either F-POSSEPN (2 g, 0.66 mmol) or F-POSSEPA was stirred with 0.07 g tetramethylammonium fluoride (0.79 mmol, 1.2 equiv) in 10 mL tetrahydrofuran (THF) at room temperature overnight in a 50 mL round bottom flask. The solution was filtered through Celite filter agent. The filtrate was dried under reduced pressure. The solid product (F$^-$@F-POSSEPA or F$^-$@F-POSSEPN) was obtained in about 20% yield.

F$^-$@F-POSSEPN $^1$H NMR (Acetone-D) δ 0.13 ppm (s, 12H), 1.05 ppm (t, 3H), 1.13 ppm (m, 16H), 2.33 ppm (m, 16H), 4.08 ppm (q, 2H).

Example 3—Omniphobic Coating Solution Application

An omniphobic coating solution was prepared by the following manner (the percentage are by weight): a mixture of 90% ethanol and 10% 5M NH$_4$OH in water was obtained. A 5% proportion, relative to the aforementioned two constituents, of 1H,1H,2H,2H-Perfluoro-n-decylphosphonic acid (having the formula $C_8F_{17}(CH_2)_2PO(OH)_2$ and available from Dojindo Molecular technologies, Inc.) and either F$^-$@F-POSSEPA or F$^-$@F-POSSEPN (as prepared in Example 3) was added to the ethanol/ammonium hydroxide solution. The mixture was ultrasonicated for 30 minutes.

The omniphobic coating solution was deposited on the plasma activated substrate by dipping. The specimen was dried in the oven at 60° C. for 5 hours.

Example 4—Initial Contact Angle Measurement

Figure 1A:
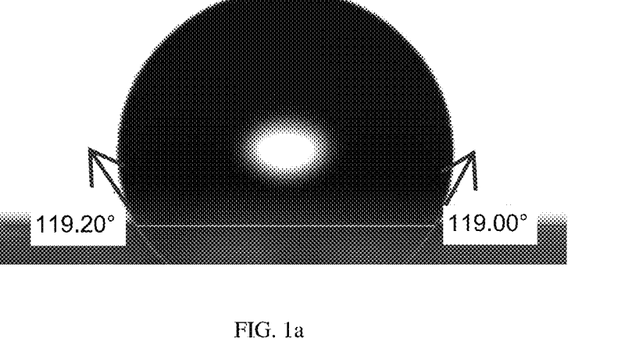
FIG. 1a shows static contact angle of water measurements of an omniphobic coating of one exemplary embodiment of the present disclosure.
Figure 1B:
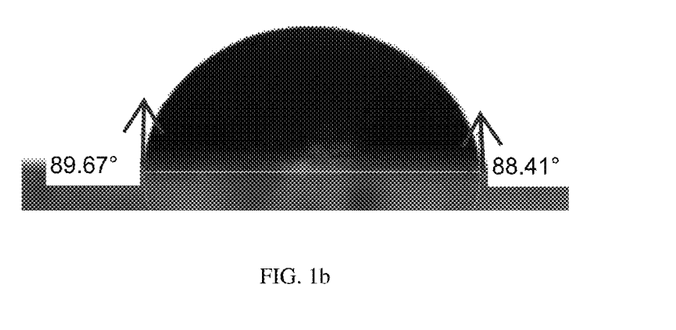
FIG. 1b shows static contact angle of hexadecane measurements of an omniphobic coating of one exemplary embodiment of the present disclosure.

The initial contact angle measurement was carried out with water and hexadecane, which provide a reference indication of the omniphobicity of the grafted substrate. The results obtained for the specimens prepared in accordance with specimens are given in Table 1 and FIG. 1.

TABLE 1

|  | 1 | 2 | 3 | 4 | 5 | Mean |
|---|---|---|---|---|---|---|
| Water | 119 | 116 | 116 | 116 | 120 | 118 |
| hexadecane | 81 | 85 | 90 | 85 | 81 | 84 |

Example 5—Mechanical Abrasion Test

Figure 2:
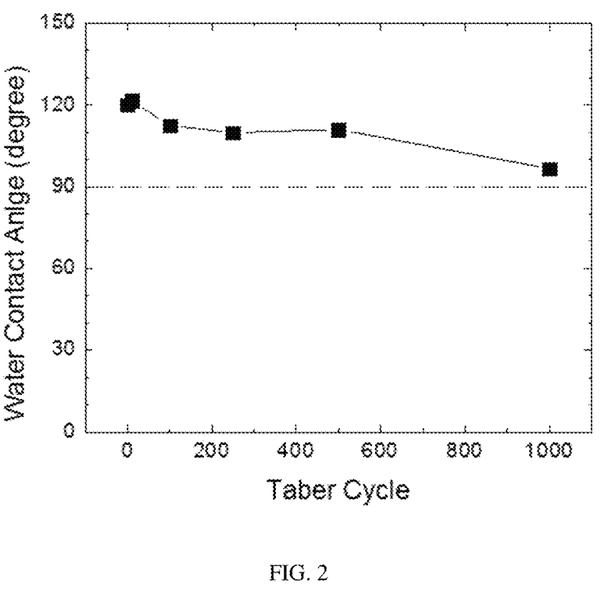
FIG. 2 is a graph of the mechanical abrasion (Taber test, ASTM D4060) test of an omniphobic coating of the present disclosure. Dotted line represents 90 degree cut off limit.

The abrasion resistance of the omniphobic substrates obtained was measured by the ASTM D4060. The test was carried out on the specimens with an abrasive disk of CS10 hardness under a load of 250 g on an area measuring 1.5 cm$^2$, with a translational rate of 50 cycles/minute and a rotation speed of 6 rpm. A specimen was deemed to be satisfactory in the test if the contact angle remains greater than 80° after 1500 cycles. The test results showed that the abrasion resistance properties of the specimen were sufficient and no degradation of water contact angle was observed (see FIG. 2).

Example 6—Chemical Resistance Test

The scope of chemical test was to measure the chemical resistance properties of the substrates provided with the omniphobic coating over various chemicals. The test object was rubbed with Bemcot clothes soaked with the chemicals, followed by a contact angle test as described in Example 4.

Figure 3:
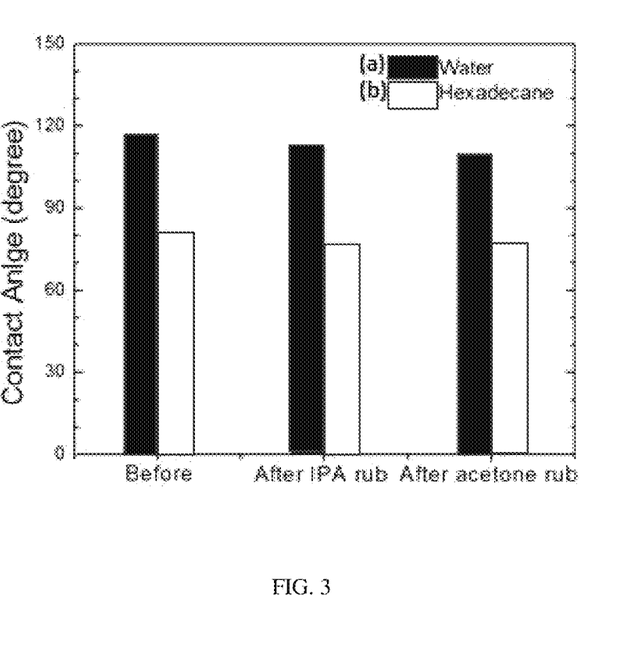
FIG. 3 is a chart of contact angle measurements of an omniphobic coating of the present disclosure after chemical test: (a) water; (b) hexadecane.
Figure 4:
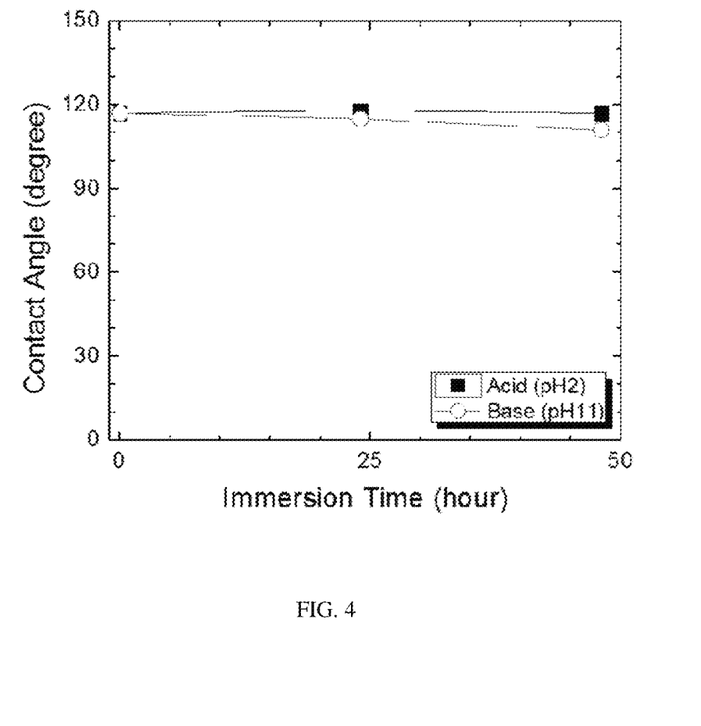
FIG. 4 is a graph of a chemical resistance test of an omniphobic coating of the present disclosure in acid (pH 2) and base (pH 11) solutions: (■) acid (pH=2); (o) base (pH=11).

The test results showed that there was no decrease in contact angle of the omniphobic coating over water and hexadecane in FIG. 3.

Example 7—Chemical Resistance Test (Acid and Base)

In general, a silane-based hydrophobic coating is vulnerable to hydrolysis and coating failure in strong acid and base conditions. The aim of this test was to measure the chemical resistance properties of the substrates provided with the omniphobic coating according to the disclosure. The test consisted of dipping the sample in aqueous hydrochloric acid (pH 2) or aqueous sodium hydroxide (pH 11) solutions at room temperature of 25° C. The most stringent standard currently requires a water contact angle of greater than 90° after 24 hours of the test. The test result shows that water contact angle of the omniphobic coating in acid and base solutions are 118 and 111 degrees, respectively. The omniphobic coating meets the requirement (>90° after 8 hours). Even at extended test period 48 hours, the water contact angle of the omniphobic coating in acid and base solutions are 117 and 108 degree, respectively. This test demonstrates that the omniphobic coating is chemically stable even in extremely acidic and basic environments.

Example 8—UV Resistance Test (Acid)

Figure 5:
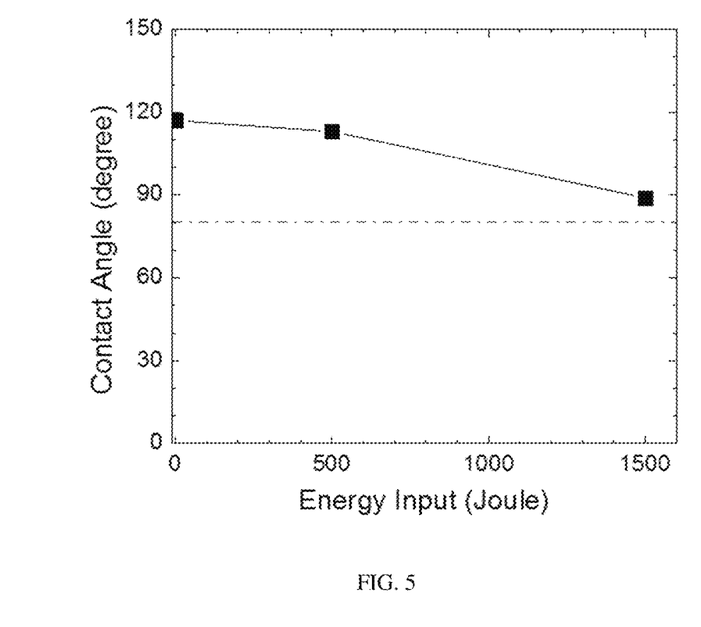
FIG. 5 is a graph of UV resistance test (SAE J2527) of an omniphobic coating of the present disclosure. Dotted line represents 80 degree cut off limit.

The test was performed on a substrate as prepared according to the methods described above and contact angles were compared when taken before and after UV exposure. The UV-A radiation resistance, measured in tests in which the specimens are continuously illuminated with a xenon lamp emitting UV radiation, the illumination intensity of which, integrated between 300 nm and 400 nm, is 60 W/m². A specimen was deemed to be satisfactory in the test if the contact angle remains greater than 80° after 2000 hours of exposure. The results of the tests indicate that the omniphobic coatings provided herein pass the SAE J2527 UV Light Exposure Standard. Results are shown in FIG. 5.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. The word "exemplary" or "illustrative" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

All patents, applications and publications referred to herein are incorporated by reference in their entirety.

What is claimed is:

1. A process for obtaining an omniphobic coating on a substrate comprising:
    a. activating a substrate by contacting the substrate with a plasma of a gas; and,
    b. depositing a first layer of an omniphobic coating comprising at least one fluoride ion-encapsulated functionalized fluoropolyhedral oligomeric silsesquioxane, and at least one fluorocompound,
    wherein the at least one fluoride ion encapsulated functionalized fluoropolyhedral oligomeric silsesquioxane (F@F-POSS) is a compound of the structural formula [1]:

[1]

wherein each $R^A$ is $R^f$ or $R^p$, provided that at least one $R^A$ is $R^p$;
$R^f$ is $F_3C(CF_2)_m(CH_2)_n-$;
$R^p$ is $(HO)_p(Y)_{2-p}P(O)(CH_2)_q-$;
Y is a hydrolysable group; m is an integer from 0 to about 15; n is an integer from 0 to about 5; p is 0, 1 or 2; and q is an integer from 0 to about 5.

2. The process of claim 1, wherein the at least one fluorocompound is selected from the group consisting of a fluoroalkyl phosphonic acid (FAPA), a fluoroalkyl phosphonate (FAPN), a fluoroalkyl silane (FAS), a fluoroalkyl halide (FAH), and combinations thereof.

3. The process of claim 1, wherein the at least one fluorocompound is a compound selected from the group consisting of a compound of the formula $$F_3C(CF_2)_{m1}(CH_2)_{n1}P(O)(Y)_{2-p1}(OH)_{p1}$$

wherein m1 is an integer from 0 to 15; n1 is an integer from 0 to 5; p1 is 0, 1 or 2; and Y is a hydrolysable group; and a compound of the formula $$F_3C-(CF_2)_{m2}-(CH_2)_{n2}-Si(Z)_{3-t}(R)_t$$

wherein m2 is an integer from 0 to 15; n2 is an integer from 0 to 5; t is and integer from 0 to 3; R is an alkyl group or a hydrogen atom; and Z is a hydrolysable group.

4. The process of claim 1, wherein the step of depositing comprises applying a mixture containing the at least one fluoride ion-encapsulated functionalized fluoropolyhedral oligomeric silsesquioxane, the at least one fluorocompound, at least one polar solvent, and an aqueous acid or base.

5. The process of claim 3, wherein the hydrolysable group is a halide group or an alkoxy group.

6. The process of claim 2, wherein the at least one fluorocompound is a fluoroalkyl phosphonic acid (FAPA).

7. The process of claim 2, wherein the at least one fluorocompound is a fluoroakyl phosphonate (FAPN).

8. The process of claim 2, wherein the at least one fluorocompound is a fluoroalkyl silane (FAS).

9. The process of claim 2, wherein the at least one fluorocompound is a fluoroalkyl halide (FAH).

10. The process of claim 3, wherein the at least one fluorocompound is a compound selected from the group consisting of a compound of the formula $$F_3C(CF_2)_{m1}(CH_2)_{n1}P(O)(Y)_{2-p1}(OH)_{p1}$$

wherein m1 is an integer from 0 to 15; n1 is an integer from 0 to 5; p1 is 0, 1 or 2; and Y is a hydrolysable group.

11. The process of claim 3, wherein the at least one fluorocompound is a compound of the formula $$F_3C-(CF_2)_{m2}-(CH_2)_{n2}-Si(Z)_{3-t}(R)_t$$

wherein m2 is an integer from 0 to 15; n2 is an integer from 0 to 5; t is and integer from 0 to 3; R is an alkyl group or a hydrogen atom; and Z is a hydrolysable group.

12. The process of claim 1, wherein the step of depositing is carried out by dip, spray, or thermal chemical vapor deposition (CVD).

* * * * *